Figure 3:
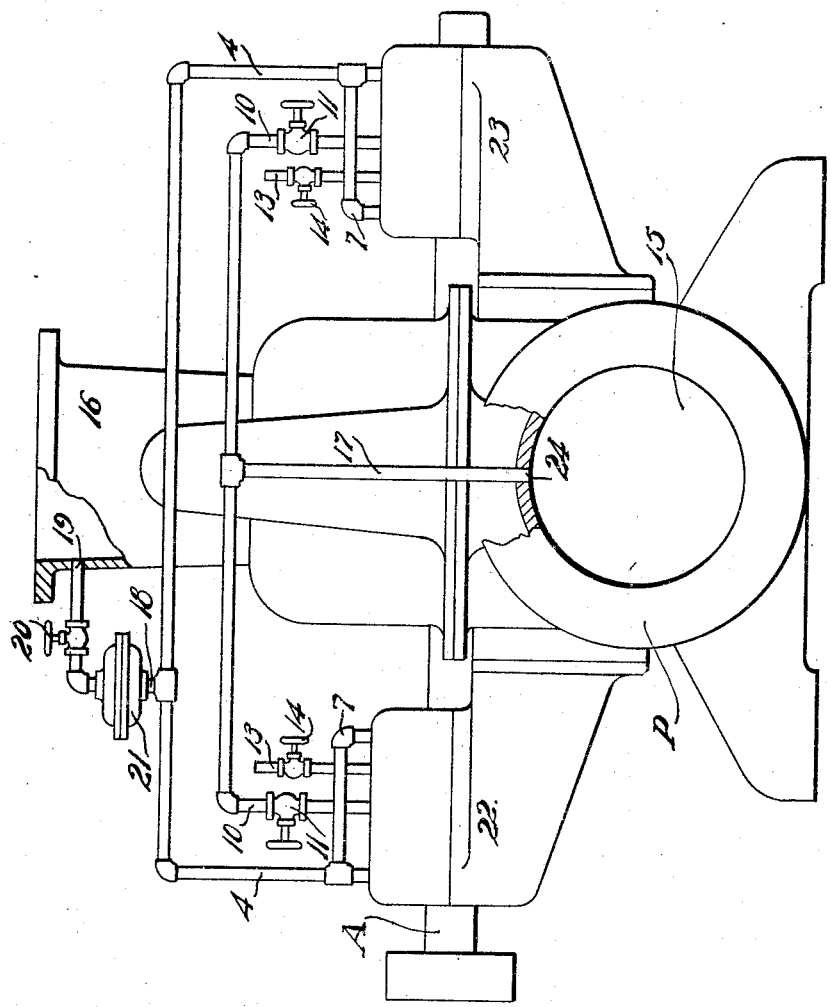

L. L. BATTU.
BEARING LUBRICATOR.
APPLICATION FILED MAY 19, 1916.
1,226,844.
Patented May 22, 1917.
2 SHEETS—SHEET 1.
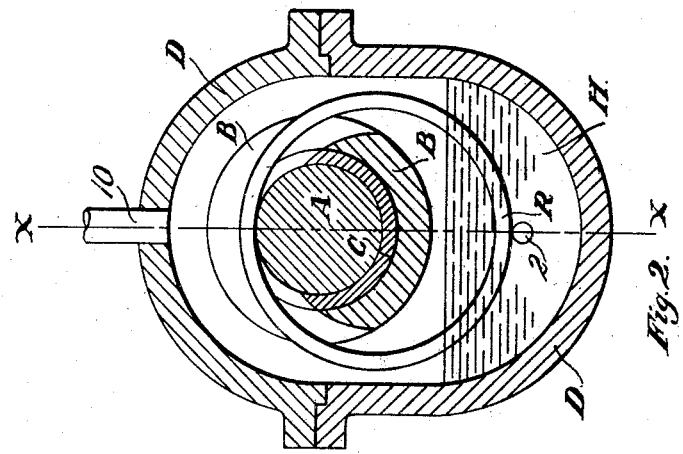
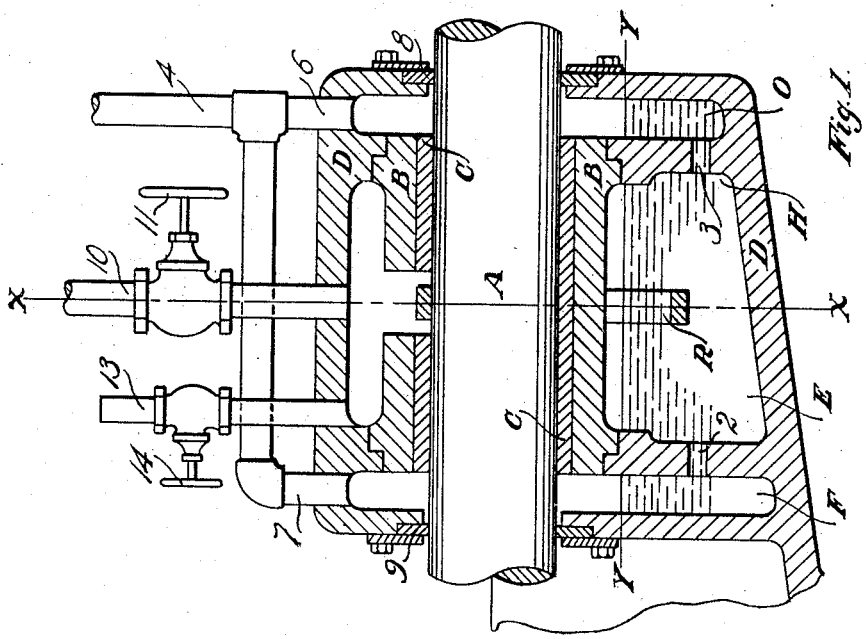
WITNESSES:
C S Brooks
E. W. Trowbridge
INVENTOR

UNITED STATES PATENT OFFICE.

LEONCE L. BATTU, OF NEW YORK, N. Y., ASSIGNOR TO RATEAU BATTU SMOOT COMPANY, OF NEW YORK, N. Y., A CORPORATION OF NEW YORK.

BEARING LUBRICATION.

1,226,844. Specification of Letters Patent. Patented May 22, 1917.

Application filed May 19, 1916. Serial No. 98,518.

*To all whom it may concern:*

Be it known that I, LEONCE L. BATTU, a citizen of the United States, whose post-office address is No. 90 West street, New York city and State, have invented certain new and useful Improvements in Bearing Lubrication, which improvements are fully set forth in the following specification.

My invention has for its object improved means by which the normal surface of a lubricant supplied to a bearing is subjected to gas pressures greater at one point than at another, thus elevating part of the level surface of the lubricant as regards the normal level. By "normal level" is meant the lubricant level at uniform pressure on all its surface.

In order to carry out my invention I divide the bearing cavity in which the lubricant is contained into several chambers and I subject the surface of the lubricant contained in the various chambers to unequal gas pressures in such a way that the lubricant level is made to decrease in one chamber and rise in another.

In the accompanying drawings, Figure I is a vertical cross section through a bearing embodying my invention.

Fig. II is a vertical cross section through X X of Fig. I.

Fig. III is a vertical view of a blower, the bearings of which show an embodiment of my invention.

In Fig. I, A is a shaft.

C is the Babbitt lining supporting the shaft A.

B is the sleeve of the bearing.

D is the bearing housing.

E is an oil cavity divided into chambers F, H and O.

Y, Y is the normal level of oil in cavity E.

2 is a duct affording passage to the oil from chamber F to chamber H.

3 is a duct affording passage to the oil from chamber O to chamber H.

R is an oil ring.

Pipe 4 allows gas to flow through pipes 6 and 7 into chambers O and F.

8 and 9 show packings around shaft A.

10 is a pipe which allows for passage of gas into chamber H.

11 is a valve located in pipe 10.

13 is a pipe allowing a gas to be discharged from chamber H.

14 is a valve located in pipe 13.

In Fig. II the same lettering and numbers have been used as in Fig. I to designate the same parts.

In Fig. III symbols corresponding to those of Figs. I and II have been used to designate the same parts.

P is a blower.

15 is the inlet to the blower P.

16 is the discharge of blower P.

Pipe 17 connects pipe 10 and inlet 15 of the blower at point 24.

Pipe 4 is connected with pipe 18, pipe 18 being connected to blower discharge 16 at point 19.

Valve 20 is located in pipe 18.

Interposed in pipe 18 is dust filter 21.

22 and 23 are bearings of blower P, which are shown in cross section of Fig. I.

Blower P is shown in Fig. III as taking air from the surrounding atmosphere.

At point 24 of the inlet the pressure of the air will be less than atmospheric pressure.

At point 19 the air will be at a pressure higher than atmospheric pressure.

I have thus provided for a source of pressure lower than atmospheric pressure and a source higher than atmospheric pressure. The pressure above atmospheric pressure of the air is allowed to exert itself on the surface of the oil contained in chambers O and F through pipes 18, 4 and 7. The oil level will be lowered in chambers O and F, and will rise in chamber H, provided the air contained in the upper portion of chamber H is allowed to flow out through pipe 13.

It will be seen that I have thus provided means to raise the oil level in chamber H in such a manner as to immerse shaft A.

A pressure lower than atmospheric pressure, which prevails at point 24, can be made to bear, through pipes 17 and 10, on the oil level in chamber H. The pressure on the oil level in chambers O and F will be atmospheric pressure or more, and the level of the oil in chamber H will rise and immerse shaft A.

The pressure of the air at point 24 is brought to bear on the oil level in chamber H when valve 11 is open and when valve 14 is closed.

I have provided packings 8 and 9, which prevent abnormal leakage of the gas under pressure delivered by pipes 4 and 7 in chambers O and F.

I have provided an oil ring R, which may be useful to start to lubricate the bearings before the gas pressure is applied, or in case such gas pressure fails.

In the event the source of gas under pressure is subjected to large variations of pressure, the oil or lubricant displaced from chambers F and O into chamber H through ducts 2 and 3 may reach the top of chamber H and the oil will flow up pipe 13, which pipe should be made long enough to take care of the column of oil in such a way that it reaches a sufficient height to balance the increased gas pressure.

It will be seen that my invention provides for means of displacing oil or lubricant in cavity E in such a way that the respective levels in chambers F, H and O are subjected to displacement due to the reduction of gas pressure in chamber H or increase of pressure in chambers F and O, or to simultaneous increase in pressure in F and O and decrease in H. By so doing I obtain the result of having shaft A immersed partially or completely in the oil or lubricant.

I have provided a dust filter 21 in order that the gas directed into chambers O and F be kept clean and that the oil or lubricant be thus maintained free of impurities.

I do not wish to be limited to a source of gas pressure generated by a blower. Other sources may be used. When a blower is available, it is highly desirable to use same to generate the gas pressure which is applied to the bearings.

It is also evident that the source of pressure obtained by the blower can be used for bearings which are used in a machine entirely independent of blower P.

Blower P may be an auxiliary machine having as specific purpose the generation of a source of gas under pressure for operation of bearings of a power generating machine and the machine driven thereby.

Having thus described my invention, I claim as new:

1. In a bearing, a cavity adapted to contain a lubricant divided into a plurality of chambers, means to subject the surface of the lubricant in one of the chambers to a gas pressure higher than the pressure prevailing in the other, and means to allow the lubricant to flow from one chamber to the other.

2. In a bearing, a cavity adapted to contain a lubricant divided into three chambers, means to subject the surfaces of the lubricant in the outer chambers to a gas pressure higher than the gas pressure in the central chamber.

3. In a bearing, a cavity adapted to contain a lubricant divided into a plurality of chambers, means to subject the surface of the lubricant in one of the chambers to a gas pressure lower than the pressure prevailing in the other and means to allow the lubricant to flow from one chamber to the other.

4. In a bearing, a cavity adapted to contain a lubricant divided into a plurality of chambers, means to allow the lubricant to flow from one chamber into the others, a source of gas pressure, means to apply said gas pressure to the surface of the lubricant contained in two of said chambers and means to maintain the gas pressure on the surface of the lubricant contained in the other chambers substantially constant.

5. In a bearing, a cavity adapted to contain a lubricant divided into three chambers, means to allow the lubricant to flow from one chamber into the others, a shaft intersecting said three chambers, a source of gas pressure, means to apply said gas pressure to the surface of the lubricant contained in the outer chambers, means to maintain the gas pressure in the central chamber substantially constant and below the pressure prevailing in the outer chambers.

6. In a bearing, a cavity adapted to contain a plurality of chambers, a blower, means to apply the gas pressure generated by said blower to the surface of the lubricant contained in a chamber and means to maintain the pressure on the lubricant contained in another chamber substantially constant.

7. In a bearing, a cavity adapted to contain a lubricant divided into three chambers, means to allow the lubricant to flow from one chamber to the other, a blower, means to apply the pressures of the gas at different points of its passage through said blower, one to the surface of the lubricant in one of said chambers and the other to the surface of the lubricant in another chamber.

8. In a bearing, a cavity adapted to contain a lubricant divided into a plurality of chambers, a blower, means to maintain the surface of the lubricant at different levels in said chambers controlled by the gas pressures generated by said blower.

9. In a bearing, a cavity adapted to contain a lubricant divided into a plurality of chambers, means to subject the surface of the lubricant contained in one chamber to the pressure of a gas discharged by a blower and means to maintain the pressure on the surface of the lubricant contained in another chamber to an amount lower than atmospheric pressure.

10. In a bearing, a cavity adapted to contain a lubricant divided into a plurality of chambers, a shaft intersecting said chamber and having its lower portion located at or above the normal level of the lubricant, a source of gas pressure and means controlled by said pressure adapted to raise the lubricant level in one of said chambers in such a manner as to immerse a portion of said shaft in said lubricant.

In witness whereof I have hereunto subscribed my name this 18th day of May, 1916.

LEONCE L. BATTU.

Witnesses:
C. S. BROOKS,
E. W. TROWBRIDGE.

Copies of this patent may be obtained for five cents each, by addressing the "Commissioner of Patents, Washington, D. C."